United States Patent

[11] 3,628,553

| [72] | Inventors | Graham Melbourne Wells;<br>Frank Wooffindin, both of Huddersfield, England |
|---|---|---|
| [21] | Appl. No. | 779,714 |
| [22] | Filed | Nov. 29, 1968 |
| [45] | Patented | Dec. 21, 1971 |
| [73] | Assignee | Hopkinsons Limited<br>Huddersfield, England |

[54] SAFETY VALVE HAVING PLURAL LOADING MEANS
6 Claims, 6 Drawing Figs.

[52] U.S. Cl. .................................................. 137/81.5,
       137/529, 137/535
[51] Int. Cl. .................................................. F16k 17/06
[50] Field of Search ................................. 137/522–524,
       529, 530, 535, 53.5, 53.8, 488, 81.5

[56] References Cited
UNITED STATES PATENTS

| 2,944,564 | 7/1960 | Pettey | 137/529 |
| 736,820 | 8/1903 | Collis | 137/535 |
| 1,152,114 | 8/1915 | Luitwieler | 137/529 |
| 1,370,459 | 3/1921 | Lippoldt | 137/523 X |
| 1,904,557 | 4/1933 | Standerwick | 137/522 X |
| 2,770,255 | 11/1956 | Goddard | 137/529 |
| 3,393,692 | 7/1968 | Geary | 137/81.5 X |

FOREIGN PATENTS

| 655,175 | 7/1951 | Great Britain | 137/529 |
| 132,329 | 2/1947 | Australia | 137/535 |

*Primary Examiner*—M. Cary Nelson
*Assistant Examiner*—Richard Gerard
*Attorney*—Holman & Stern

ABSTRACT: A safety valve provided with two loadings on the same valve component to effect instantaneous operation of the valve, with one of the loadings being the normal valve loading, such for example as torsion bars or a spring, and the other loading being a supplementary loading which acts on the valve component through an actuator and precompressed spring.

SAFETY VALVE HAVING PLURAL LOADING MEANS

BACKGROUND OF THE INVENTION

This invention relates to valves, and more particularly to safety valves for use with any form of fluid system, such for example as a steam boiler. The invention relates more particularly to high-pressure safety valves.

As is well known, safety valves for use with fluid systems are loaded in various ways, and are adapted to blow off or open when a predetermined fluid pressure is reached or exceeded which overcomes the loading, thus preventing damage to the system and/or injury to the operator or operators.

Such safety valves, in general, leak when the pressure in the fluid system approaches the safety valve blowoff or open pressure value, and after blowing off such valves remain open or at least leak until the pressure in the fluid system is reduced a sufficient amount below the valve blowoff pressure. There are disadvantages since there is an undesirable leaking of fluid from the system before closure of the safety valve, and when pressure of the fluid has been reduced to a safety level. There is also an undesirable leaking of fluid from the system when the operating pressure in the system approaches the safety valve blowoff or open pressure, but does not actually attain such blowoff or open pressure.

It has been proposed to provide such safety valves with a loading supplementary or additional to the normal loading to obviate or mitigate these disadvantages, with such supplementary or servo loading being air pressure, and it has been suggested that if this supplementary or servo loading fails, that is if the air pressure supply fails, then the safety valve operates as a normal safety valve. However, it is considered a danger of such a supplementary or servo air pressure loading that under certain circumstances of failure then the safety valve will be locked in a closed position until the pressure of the fluid system exceeds its safe pressure value to a very substantial degree with consequent danger to the system and/or operator or operators.

It is an object of the present invention to provide a safety valve for use with a fluid system which obviates or mitigates the aforesaid disadvantages by being provided with supplementary or servo loading such as will permit the safety valve to operate normally should removal of the supplementary or additional loading be delayed or prevented.

SUMMARY OF THE INVENTION

According to the present invention, there is provided a safety valve for use with a fluid system and comprising a normal loading and a supplementary or servo loading, each of which is applied to the same valve component of the safety valve normally to maintain the safety valve closed unless the loadings are overcome by the fluid pressure, with the supplementary or servo loading being applied to the valve component through the intermediary of a precompressed resilient connector operated via an actuator such that operation of the actuator instantaneously either applies or removes the supplementary or servo loading on the valve component and so instantaneously closes the safety valve or allows it to open and such that failure or locking of the actuator and consequently nonremoval of the supplementary or servo loading does not prevent normal functioning of the safety valve.

The actuator may take any convenient form such, for example, as a double-acting pneumatic ram, an electric linear actuator, a device operated by the fluid of the fluid system, combinations thereof, or any other convenient mechanism. The actuator is, preferably but not essentially, remote controlled.

BRIEF DESCRIPTION OF THE DRAWINGS

Embodiments of the present invention will now be described, by way of example, with reference to the accompanying drawings, in which.

DETAILED DESCRIPTION OF THE INVENTION

In the following description, the notation "lb.f./in.$^2$ means pounds feet per square inch.

Figure 1:
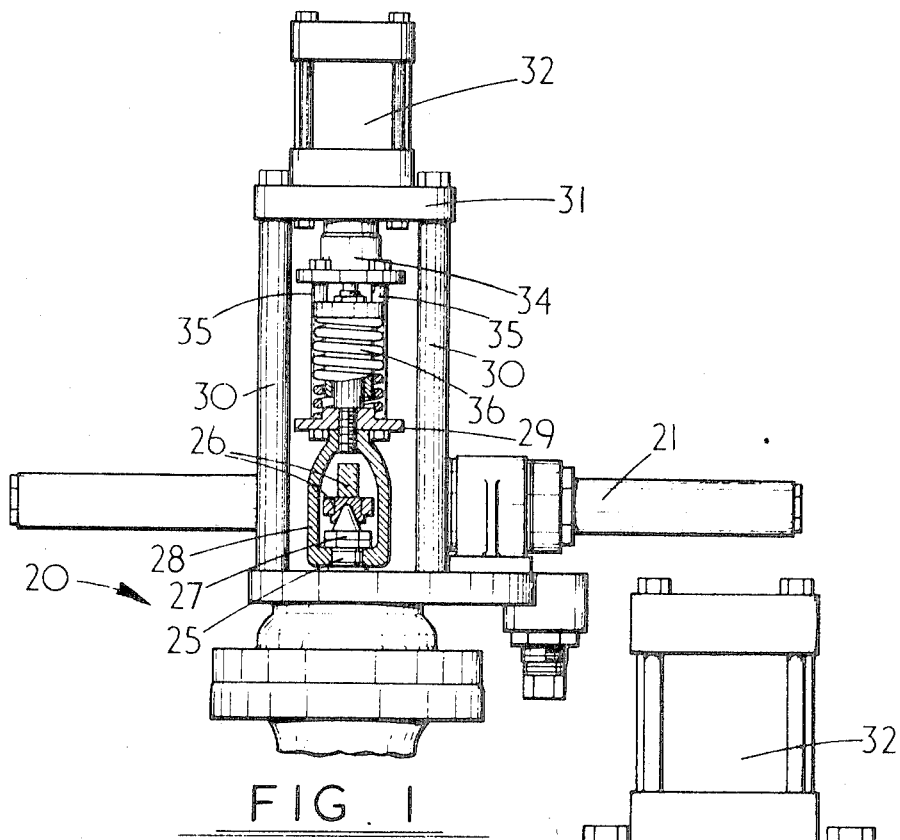
FIG. 1 is an elevation, partly in section, of a safety valve in accordance with the present invention.
Figure 2:
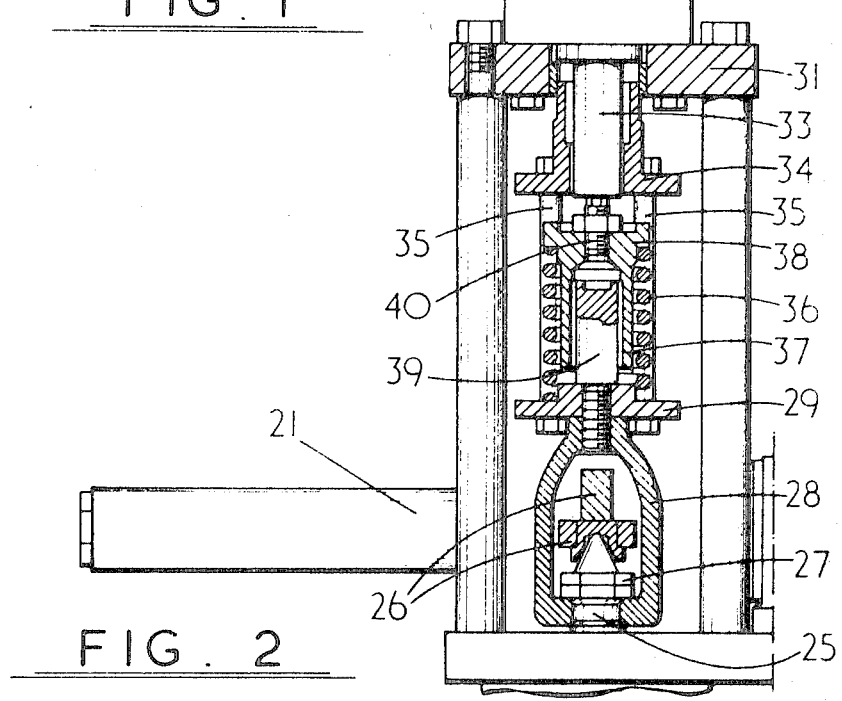
FIG. 2 is a detail partly sectional view of FIG. 1 to an enlarged scale.
Figure 3:
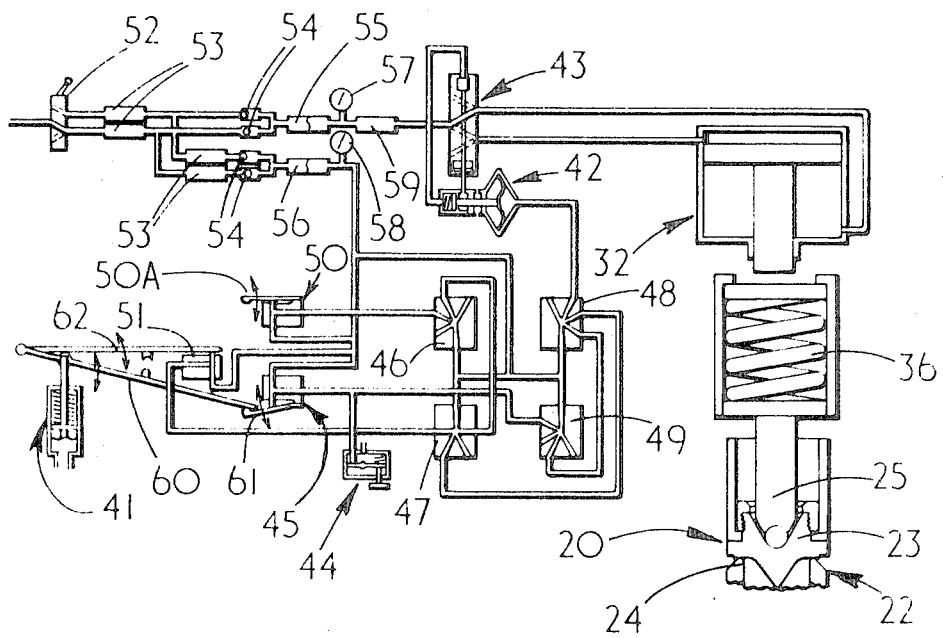
FIG. 3 is a fluid logic control system diagram incorporating the safety valve of FIGS. 1 and 2.

Referring firstly to FIGS. 1 to 3, a safety valve 20 may be of any convenient construction and may normally be loaded to a predetermined degree in any convenient manner, for example by torsion bars 21.

The safety valve 20 is applied to a steam boiler generally indicated at 22, and a valve component 23 to which the normal loading of predetermined value is applied sits on a normal valve seating 24 and has a spindle 25. In the present example, the normal loading is by means of the torsion bars 21 acting on levers 26 at the end of the spindle 25.

According to the present invention there is secured to the spindle 25 by spindle nuts 27 one end of a yoke 28 to the other end of which is secured a plate 29. Pillars 30 extend upwardly or outwardly from the safety valve body and a bridge 31 is mounted therebetween. An actuator in the form of a double-acting pneumatic ram 32 is carried above the bridge 31 and its piston rod 33 extends through the bridge 31 and is guided by a stop member 34 slidable in the bridge 31 and carried by stop pillars 35 extending between the plate 29 and the stop member 34.

A precompressed helical spring 36 is disposed between the stop member 34 and the plate 29 and surrounds a sleeve 37 having its end adjacent the ram 32 in the form of a plate 38 and a centrally disposed spring guide rod 39 threadedly engaging the yoke 28 and the yoke plate 29.

The sleeve plate 38 is contacted by the piston rod 33 of the ram 32 through the intermediary of an adjusting screw and nut unit 40. The double-acting ram 32 is preferably remote controlled by a fluid logic control system (see FIG. 3) associated with the steam boiler 22.

The fluid logic system includes a pressure sensing element controlling the servo loading of the safety valve and is in the form of a pressure switch 41 of known form, for example a diaphragm loaded by a pair of compensating springs which transmits its deflections through a lever mechanism, giving, say, a 50 to one magnification of physical movement to the control orifices of the fluid logic system. This system works on air purified by duplicate filters down to 0.2 micron particle size elimination. The control system operates at, say, 4 lb.f./in.$^2$. The signals pass through a pressure amplifier 42 to control a four-way air operated spool valve 43 controlling, say a 50 lb.f./in.$^2$ air supply to the pneumatic ram 32 mounted above the safety valve 20 which exerts a load through the servo-loading spring 36. The pneumatic ram 32 is double acting and a degree of precompression is applied to the servo-loading spring 36 so that part of this servo loading is instantaneously removed or applied so as to give instant and positive action in the opening and closing of the safety valve.

If, for any reason at all, any part of the control system fails to function, then a transient rise in pressure in the boiler 22 of 10 percent above normal design will occur for a very short time since the servo-loading spring 36 can never be compressed solid. Under these conditions, the safety valve 20 functioning as a normal direct-acting safety valve will overcome the addition of the servo loading. It will open in the normal way and will discharge steam so as to bring the boiler pressure back under control.

A test button 44 is incorporated in the control circuit so that at any time the reliability of the controls can be checked. A depression of the test button will cause servo loading to be reapplied.

The reliability of the fluid logic control system, coupled with the inherent fail-safe feature of the servo-loading spring 36 fitted to each and every safety valve, enables a single control cubicle to be utilized for a group of safety valves, without decreasing at all the reliability of the system as a whole.

As an added safeguard against abuse of the system, a cutout control 45 is incorporated and is such that at some predetermined value, normally considered to be about two-thirds of the operating pressure, servo loading is removed. Thus, it is impossible to use servo loading when the boiler is without pressure.

The fluid logic control system also includes four pneumatic fluidic switches or gates 46 to 49 (hereinafter simply called "fluidic elements"), and this group of fluidic elements is known as "module." Fluidic elements 46, 48 and 49 are designated NOR elements, that is when each receives supply air but not an additional input signal then it will always give an output signal. Conversely, when there is an input in addition to supply air, the output is to vent. Fluidic element 47 is designated B.S. and when in receipt of an input signal in addition to supply air it gives an output signal which continues even when the creating input signal is removed. The output signal can only be altered by the introduction of an alternative input signal.

A set pressure control for opening of the safety valve 20 is indicated at 50 and a blowdown control for closing the safety valve 20 is indicated at 51.

Supply air is delivered via a four-way manually operated valve 52, filters 54, nonreturn valve 54, a high-pressure regulator 55 and a low-pressure regulator 56. Pressure dials 57 and 58 are provided and a lubricator 59 may be located between the high-pressure regulator 55 and the spool valve 43.

FIG. 3 shows the arrangement when pressure is below the previously determined value of approximately two-thirds boiler operating pressure, when servo loading is not applied.

At this stage the orifice of cutout control 45 is uncovered and air is escaping from the fluidic elements 46, 47 and 48, and throughout the operation there will always be a slight escape of 4 lb.f./in.$^2$ air, which will give a very slight pressurization of the control cubicle which will prevent the ingress of dust and dirt.

When pressure in the boiler 22 rises, a pressure switch arm 60 rises to close the cutout control orifice via valve 61, and causes pressurization of the diaphragm of the pressure amplifier 42. This operates the four-way air operated valve 43, and 50 lb.f./in/$^2$ air is admitted to the upperside of the piston in the ram 32 and servo loading is applied, via the servo-loading spring 36, to the safety valve 20.

When pressure is somewhere between the pressure at which servo loading will be removed, and the pressure at which, on a falling pressure, it would be reapplied, further rising movement of the pressure switch levers 60, while not yet having uncovered the orifice of the set pressure control 50, has, nevertheless, moved valve lever 62 to uncover the orifice of the blowdown control 51 and remove the signal from the B.S. fluidic element 47. This has caused no change in the actual application of servo loading, but renders possible the switching action when it is desired that this should take place.

When the pressure in the boiler has risen to such an extent that the arm 60 of the pressure switch 41 has lifted valve lever 50A to uncover the orifice of the set pressure control 50, the diaphragm of the pressure amplifier 42 is depressurized, and the four-way air operated valve 43 vents the upperside of the piston of the pneumatic ram 32, and at the same time pressurizes the underside of the piston. Thus, the piston is moved upwards, servo loading is removed and the safety valve opens as a conventional safety valve, except that this action has taken place far more rapidly and instantaneously than happens with a conventional safety valve. This means that the pressure rise between commencement of discharge of steam from the safety valve and full lift being achieved is negligible.

When the boiler pressure falls below the pressure at which the servo loading was removed, but has not yet fallen to the pressure at which it has to be reapplied, the set pressure control orifice closes, but this has no effect on the application of servo loading.

On fall of boiler pressure to that at which servo loading has to be reapplied, the lever arm 60 of the pressure switch 41 closes the blowdown control orifice, resulting in the repressurization of the diaphragm of the pressure amplifier 42, and instantaneous reapplication of servo loading.

At pressure below two-thirds of operating pressure, the arm 60 of the pressure switch 41 drops to such an extent that the cut out control orifice is uncovered and the diaphragm of the pressure amplifier 42 is depressurized and the servo loading is removed.

When testing, operation of the test button 44 will effect depressurization of the diaphragm of the pressure amplifier 42. This enables the correct functioning of the servo loading mechanism to be manually tested.

Release of the test button 44 causes servo loading to be reapplied and ensures that safety valve performance, with complete freedom from leakage, continues.

Hence, it will be manifest that the precompressed helical spring 36 and double-acting ram 32 serve as a supplementary or servo loading being instantaneously removed or applied to the safety valve 20, thus allowing instantaneous or "snap action" opening and closing of the safety valve due to the precompression of the helical spring 36.

It is stressed that due to the arrangement of the precompressed helical spring 36, if the ram 32 fails or locks with the safety valve in the closed position then the helical spring 36 can be further compressed by the increased fluid pressure thus allowing the safety valve 20 to operate in the customary manner, albeit at a slightly higher pressure than normal, for example of the order of 10 percent, which is still not sufficiently high to cause a dangerous condition to arise in the fluid system.

Figure 4:
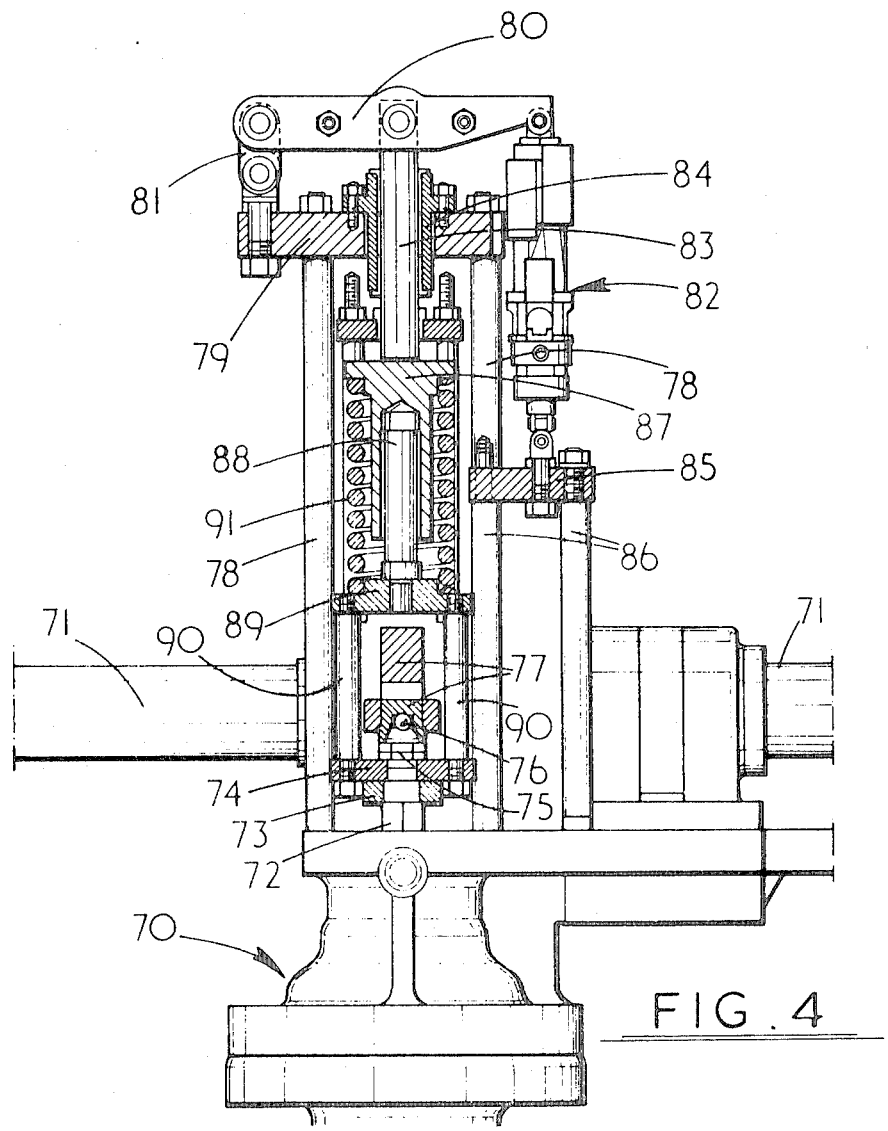
FIG. 4 is an elevation, partly in section, of another form of safety calve in accordance with the present invention.
Figure 5:
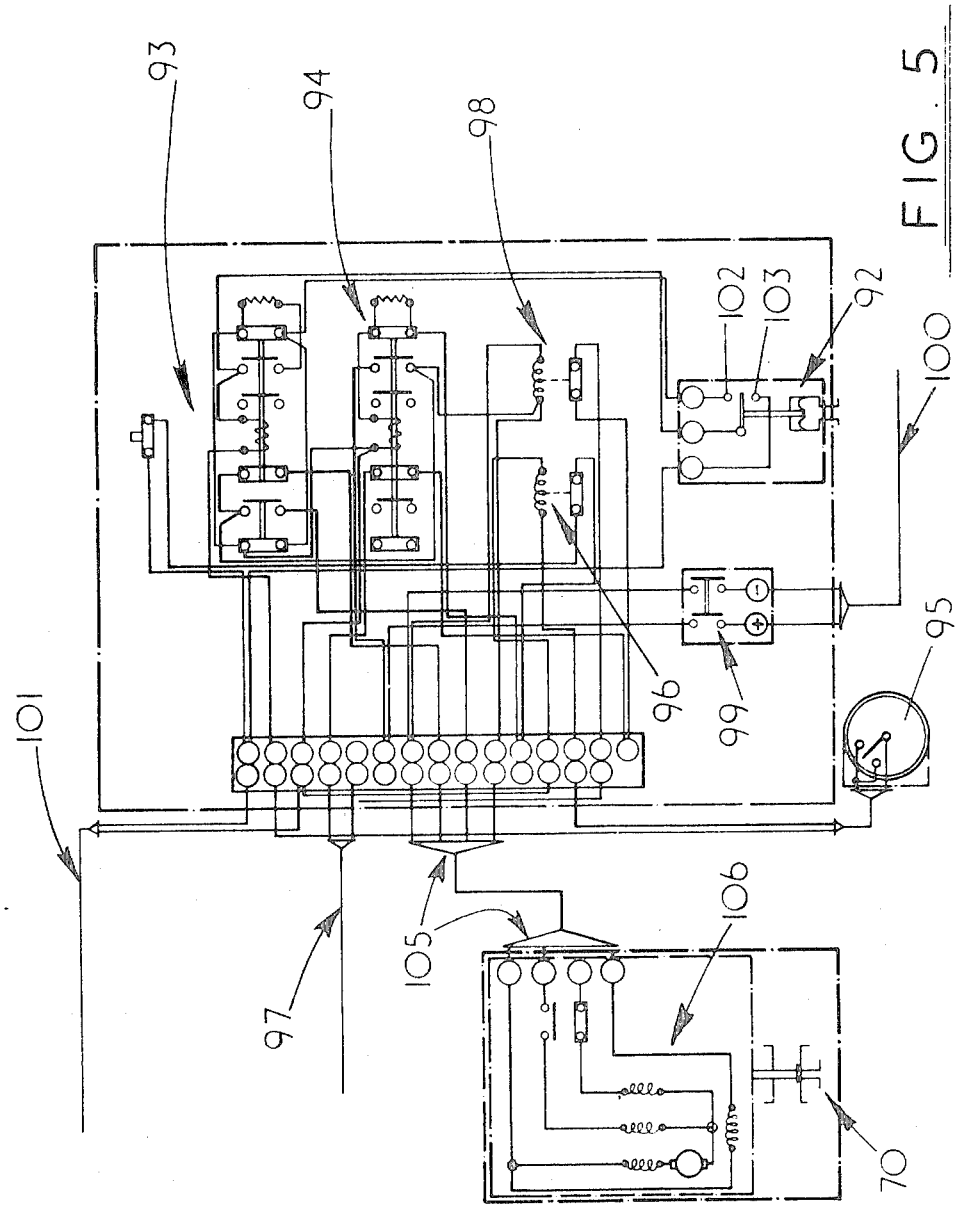
FIG. 5 is an electrical control circuit diagram incorporating the safety valve of FIG. 4; and, FIG. 6 is a fragmentary sectional view of yet another safety valve in accordance with the present invention.

In a second example as shown in FIGS. 4 and 5, an electrical actuator is employed. Here again a safety valve 70 is of conventional construction and the normal loading is by means of a torsion bar or bars 71. The valve component to which the normal loading is applied sits on its customary seating and has a spindle 72 upstanding or outstanding therefrom, which spindle 72 carries a collar 73 superimposed on which is a loading plate 74.

The loading plate 74 is secured to the spindle collar 73 by spindle nut 75.

At the top of the spindle 72 is a ball 76 to which levers 77 are applied and on which the torsion bar or bars 71 act. Pillars 78 extend up from the valve body and mount at their top a bridge 79 to one end of which is fulcrummed a lever 80 via links 81. The lever 80 at its other end is acted upon by a linear electrically operated actuator 82 and the lever 80 between the fulcrum and actuator 82 mounts a spindle 83 extending through the bridge towards the safety valve 70. The bridge 79 carries a spindle guide 84 to ensure linear movement.

The linear actuator 82 at its other end is carried or supported by a bridge 85 mounted on pillars 86 secured to the valve body.

The spindle 83 acts and contacts the closed end of a sleeve 87 surrounding a spring guide 88 to the other end of which is secured a stop plate 89 connected to the loading plate 74 by short loading pillars 90.

A precompressed helical spring 91 is located between the closed end of the sleeve 87 which has an outwardly directed rim for this purpose and the stop plate 89 supported above the loading plate 74.

The linear electrically operated actuator 82 may be remote controlled by any convenient system which may be operated by the pressure in the steam boiler.

A convenient electrical control circuit is shown in FIG. 5, in which 70 indicates the linear actuator loaded safety valve and 92 a pressure switch acted upon by, for example, boiler pressure.

Briefly, the circuit comprises in electrical connection as shown a test contactor 93, a test and power failure contactor 94, a pressure gauge 95 and its relay 96, an alarm 97 (the alarm device itself not being shown) and its relay 98, an isolator 99 with a DC supply 100 therefor, and main circuit DC supply is indicated at 101.

The pressure switch 92 has high- and low-pressure contacts 102 and 103 respectively.

The circuit also includes limit switches 105 connected to the linear actuator loaded safety valve 70 via an actuator coil and solenoid arrangement 106.

This safety valve with its supplementary or servo loading functions exactly in the same manner as that described with reference to FIGS. 1 to 3, save that it electrically operated as opposed to being pneumatically operated.

More specifically, the pneumatic ram is replaced by an electrical linear actuator, that is a device by which the energy available from an electrical motor is transmitted into linear motion, thereby fulfilling the same function as the direct acting piston and spindle of a pneumatic ram.

Figure 6:
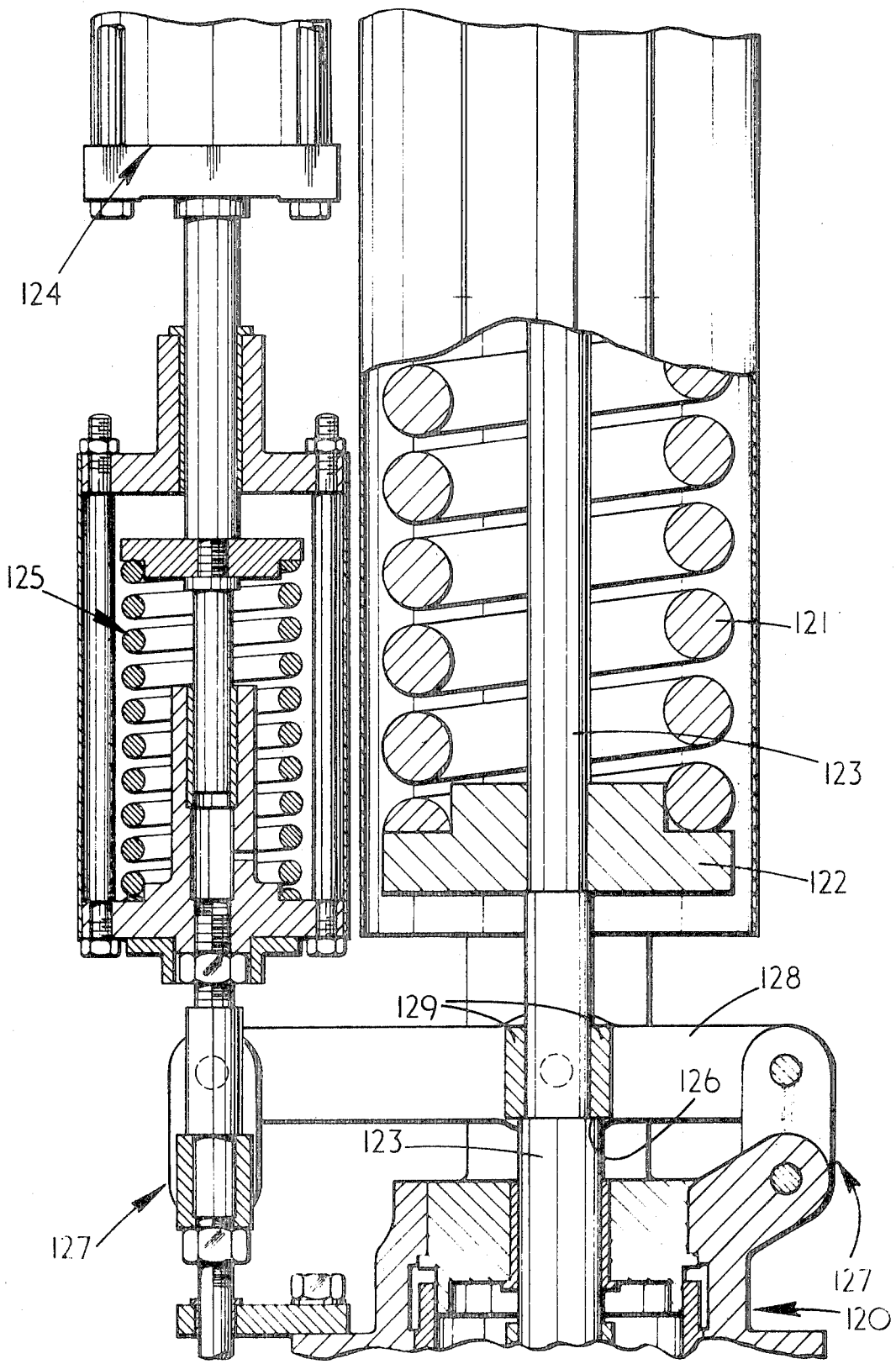

In FIG. 6, a safety valve 120 has a normal loading constituted by a spring 121 acting on a plate 122 connected to a valve spindle 123, and, in this instance, the servo loading is constituted by a double-acting pneumatic ram 124 acting on a precompressed helical spring arrangement 125 which, in turn, acts on an abutment shoulder 126 of the spindle 123 through the intermediary of a linkage system 127, a pivoted lever 128 and a fork member 129 carried by the lever 128.

This safety valve may form part of the fluid logic control system of FIG. 3, and functions in the same manner as the safety valve described and illustrated with reference to FIGS. 1 and 2 of the drawings.

By the present invention, there is thus provided a safety valve having a supplementary or servo loading which is instantaneously removed or applied, thus allowing instantaneous opening and closing of the safety valve, and also preventing an undesirable loss of fluid from the fluid system when operating pressures in the fluid system are near to the blowoff or open pressure of the safety valve, and which, if the actuator of the supplementary or servo loading fails or locks, and if the mechanism transmitting the supplementary or servo loading fails or locks in any manner, will still operate in the normal manner.

It is also an advantage of the present invention that the supplementary or servo loading can be operated at a remote location.

What is claimed is:

1. A safety valve for use with a fluid system, comprising a movable valve component, a main loading means of predetermined value applied to the movable valve component and serving to hold the valve component against fluid system pressure, means for applying a supplementary loading to the movable valve component and including a precompressed spring acting on the movable valve component to impart a snap-action movement to the valve component upon removal or application of the supplementary loading, two spaced plates between which the spring is centrally guided and located, and a double-acting pneumatic ram operable under predetermined fluid pressure conditions, to apply or remove the supplementary loading, the valve component being provided with a spindle, a yoke connecting one of the plates to the valve spindle, and the other plate being contacted by the piston of the double-acting pneumatic ram.

2. The safety valve as claimed in claim 13 including a screw adjuster carried by the plate for contact by the piston of the pneumatic ram.

3. A safety valve for use with a fluid system, comprising a movable valve component, a main loading means of predetermined value applied to the movable valve component and serving to hold the valve component against fluid system pressure, means for applying a supplementary loading to the movable valve component and including a precompressed spring acting on the movable valve component to impart a snap-action movement to the valve component upon removal or application of the supplementary loading, means, operable under predetermined fluid pressure conditions, to apply or remove the supplementary loading, including levers on said valve component, and said main loading means including torsion bars operably related to the levers for effecting the normal loading.

4. A safety valve for use with a fluid system, comprising a movable valve component, a main loading means of predetermined value applied to the movable valve component and serving to hold the valve component against fluid system pressure, means for applying a supplementary loading to the movable valve component and including a precompressed spring acting on the movable valve component to impart a snap-action movement to the valve component upon removal or application of the supplementary loading, a double-acting pneumatic ram operable under predetermined fluid pressure conditions, to apply or remove the supplementary loading, and a fluid logic control system having a pressure sensing element linked operably and pneumatically to the pneumatic ram to control the ram.

5. The combination as claimed in claim 4 wherein said fluid logic control system includes an air supply system, a four-way air-operated valve, a pressure amplifier, and means connecting the air supply system to the valve controlling air supply to the ram and controlled by signals from the pressure amplifier.

6. The combination as claimed in claim 5, wherein said fluid logic control system includes a cutout control, a set pressure control, a blowdown control, and a system test control, a module of four fluidic elements, means connecting the module pneumatically to the air supply system, the pressure amplifier, the cutout control, the set pressure control, the blowdown control, and the system test control.

* * * * *